(12) United States Patent
Baucom et al.

(10) Patent No.: US 9,581,777 B2
(45) Date of Patent: Feb. 28, 2017

(54) COUPLING SYSTEM FOR FIBER OPTIC CABLE USING FOLDED TAPE

(71) Applicant: Corning Cable Systems LLC, Hickory, NC (US)

(72) Inventors: James Lee Baucom, Conover, NC (US); Jason Clay Lail, Conover, NC (US); William Welch McCollough, McAdenville, NC (US); David Alan Seddon, Hickory, NC (US)

(73) Assignee: CORNING OPTICAL COMMUNICATIONS LLC, Hickory, NC (US)

( * ) Notice: Subject to any disclaimer, the term of this patent is extended or adjusted under 35 U.S.C. 154(b) by 424 days.

(21) Appl. No.: 13/852,810

(22) Filed: Mar. 28, 2013

(65) Prior Publication Data
US 2015/0268428 A1    Sep. 24, 2015

(51) Int. Cl.
G02B 6/44    (2006.01)

(52) U.S. Cl.
CPC ............. G02B 6/4403 (2013.01); G02B 6/449 (2013.01); *G02B 6/448* (2013.01); *G02B 6/4494* (2013.01); *Y10T 29/49908* (2015.01)

(58) Field of Classification Search
CPC .................................................. G02B 6/4403
USPC ......................................................... 385/114
See application file for complete search history.

(56) References Cited

U.S. PATENT DOCUMENTS

| | | |
|---|---|---|
| 4,232,935 A | 11/1980 | Rohner et al. |
| 4,909,592 A | 3/1990 | Arroyo et al. |
| 5,006,670 A * | 4/1991 | Plant ................ H01B 7/2825 174/102 SC |
| 5,133,034 A | 7/1992 | Arroyo et al. |
| 5,305,410 A | 4/1994 | Arroyo |
| 5,906,952 A | 5/1999 | Everaere et al. |
| 6,160,939 A | 12/2000 | Sheu |
| 6,236,790 B1 | 5/2001 | Okada et al. |
| 6,278,826 B1 | 8/2001 | Sheu |
| 6,594,427 B1 | 7/2003 | Dixon et al. |
| 6,631,229 B1 * | 10/2003 | Norris ................ G02B 6/4494 385/109 |

(Continued)

FOREIGN PATENT DOCUMENTS

| | | |
|---|---|---|
| CN | 1912662 A | 2/2007 |
| EP | 1085357 A2 | 3/2001 |
| EP | 1746447 | 10/2011 |

OTHER PUBLICATIONS

Norris, Richard H., et al., "The Validity of Emerging Test Techniques for the Evolving Outside Plant Cable Design," IWCS 2007, 6 pages.

(Continued)

*Primary Examiner* — Sung Pak
(74) *Attorney, Agent, or Firm* — William D. Doyle

(57) ABSTRACT

A fiber optic cable includes a tube, a stack of fiber optic ribbons twisting along a lengthwise axis through the tube, and water-blocking tape positioned at least partially around the stack, between the stack and the tube. The water-blocking tape is folded such that an elevated portion of the water-blocking tape is raised. As the stack twists along the lengthwise axis of the tube, corners of the stack interface with the elevated portion to provide intermittent frictional coupling between the stack and the tube.

20 Claims, 1 Drawing Sheet

(56) References Cited

U.S. PATENT DOCUMENTS

| | | | |
|---|---|---|---|
| 6,760,523 B2 | 7/2004 | Nechitailo | |
| 6,778,745 B2 | 8/2004 | Debban, Jr. et al. | |
| 6,847,768 B2 | 1/2005 | Lail et al. | |
| 6,876,798 B2 | 4/2005 | Triplett et al. | |
| 6,931,184 B2 | 8/2005 | Tedder et al. | |
| 6,970,629 B2 | 11/2005 | Lail et al. | |
| 7,515,795 B2 | 4/2009 | Overton et al. | |
| 7,567,739 B2 | 7/2009 | Overton et al. | |
| 7,599,589 B2 | 10/2009 | Overton et al. | |
| 8,145,022 B2 | 3/2012 | Overton et al. | |
| 8,170,388 B2 | 5/2012 | Schrauwen et al. | |
| 8,195,018 B2 | 6/2012 | Overton et al. | |
| 8,208,873 B2 | 6/2012 | Seidel et al. | |
| 8,229,263 B2 | 7/2012 | Parris et al. | |
| 8,369,668 B1 | 2/2013 | McNutt et al. | |
| 8,676,011 B1 | 3/2014 | McNutt et al. | |
| 8,682,123 B2 | 3/2014 | Parris | |
| 9,170,388 B2 | 10/2015 | Baucom et al. | |
| 2004/0047573 A1* | 3/2004 | Lail | G02B 6/4405 385/111 |
| 2004/0091221 A1 | 5/2004 | Debban, Jr. et al. | |
| 2004/0120666 A1 | 6/2004 | Chalk et al. | |
| 2004/0208462 A1 | 10/2004 | Parsons et al. | |
| 2005/0180704 A1 | 8/2005 | Terry et al. | |
| 2005/0213921 A1 | 9/2005 | Mertesdorf et al. | |
| 2007/0019915 A1 | 1/2007 | Overton et al. | |
| 2007/0269172 A1 | 11/2007 | Parsons et al. | |
| 2008/0145010 A1 | 6/2008 | Overton et al. | |
| 2008/0181564 A1* | 7/2008 | Overton | G02B 6/4494 385/109 |
| 2009/0003779 A1* | 1/2009 | Parris | G02B 6/4429 385/103 |
| 2009/0279833 A1* | 11/2009 | Overton | G02B 6/4494 385/111 |
| 2010/0303431 A1 | 12/2010 | Cox et al. | |
| 2011/0116753 A1 | 5/2011 | Overton et al. | |
| 2011/0293230 A1 | 12/2011 | Wells et al. | |
| 2012/0014652 A1* | 1/2012 | Parris | G02B 6/4494 385/111 |
| 2012/0120389 A1* | 5/2012 | Logan | G01D 5/35345 356/73.1 |
| 2013/0084047 A1* | 4/2013 | Baucom | G02B 6/44 385/114 |
| 2014/0199037 A1 | 7/2014 | Hurley et al. | |
| 2014/0369656 A1 | 12/2014 | Gimblet et al. | |
| 2015/0268428 A1 | 9/2015 | Baucom et al. | |
| 2015/0268429 A1 | 9/2015 | Baucom et al. | |
| 2016/0018613 A1 | 1/2016 | Baucom et al. | |

OTHER PUBLICATIONS

Temple, Kenneth D., et al., "Update: Gel-Free Outside Plant Fiber-Optic Cable Performance Results in Special Testing," IWCS 2007, 6 pages.

Van Vickle, Patrick, et al., "Central Tube Cable Ribbon Coupling," IWCS 2008, 6 pages.

Norris, Richard H., et al., "Dry Central Tube Ribbon Cables for the Outside Plant Environment," Proceedings of the 51st IWCS, 2002, 9 pages.

Patent Cooperation Treaty International Search Report and Written Opinion for International Application No. PCT/US2012/057789; mailing date Dec. 21, 2012, 11 pages.

AU2012315847 Examination Report Dated Jan. 15, 2015.

English Translation of CN201280045423.4 First Office Action Dated Aug. 15, 2016, Chinese Patent Office.

International Search Report of the International Searching Authority; PCT/US2012/057789; International Mailed Dec. 21, 2012; European Patent Office.

* cited by examiner

COUPLING SYSTEM FOR FIBER OPTIC CABLE USING FOLDED TAPE

BACKGROUND

Aspects of the present disclosure relate generally to fiber optic cables, and more specifically to frictional coupling of optical elements within the fiber optic cables to surrounding structure of the cables.

Coupling of optical elements, such as stacks of ribbons of optical fibers, within fiber optic cables to surrounding structure of the cables minimizes axial displacement and subsequent buckling of the optical elements that may lead to increased optical fiber signal attenuation. For example, if optical elements are insufficiently coupled, the optical elements may become redistributed in a cable when the cable stretches or bends; and, as a result, the optical elements may become unevenly packed into a section of the cable. When the cable contracts in cooler temperatures or when tension is released, the optical elements in the packed section may then buckle or kink, leading to attenuation and/or fiber damage.

Foam and special foam tapes may be used in fiber optic cables to provide coupling between optical elements and the surrounding structure. However, the foam may be bulky and may correspondingly increase a cable diameter and associated material costs. A need exists for an efficient solution to couple optical elements within fiber optic cables to surrounding structure of the cables without increasing the cable diameter and associated material costs.

SUMMARY

One embodiment relates to a fiber optic cable, which includes a tube having an interior, a stack of fiber optic ribbons extending through the interior of the tube, and water-blocking tape positioned at least partially around the stack between the stack and the tube, in the interior of the tube. The stack twists along a lengthwise axis of the tube, and the water-blocking tape is folded such that an elevated portion of the water-blocking tape is raised toward a lengthwise center of the interior of the tube. As the stack twists along the lengthwise axis of the tube, at a position along the length of the cable in which a first cross-sectional dimension of the stack is aligned with the elevated portion, the stack interfaces with the elevated portion to provide frictional coupling between the stack and the tube. At another position along the length of the cable in which a second cross-sectional dimension of the stack is aligned with the elevated portion, the stack has less frictional coupling with the tube. As such, the twisting of the stack in combination with the folded water-blocking tape provides intermittent or variable coupling of the stack and the tube.

Additional features and advantages are set forth in the Detailed Description that follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE FIGURES

The accompanying Figures are included to provide a further understanding, and are incorporated in and constitute a part of this specification. The drawings illustrate one or more embodiments, and together with the Detailed Description serve to explain principles and operations of the various embodiments. As such, the disclosure will become more fully understood from the following Detailed Description, taken in conjunction with the accompanying Figures, in which.

DETAILED DESCRIPTION

Before turning to the Figures, which illustrate exemplary embodiments now described in detail, it should be understood that the present inventive technology is not limited to the details or methodology set forth in the Detailed Description or illustrated in the Figures. For example, as will be understood by those of ordinary skill in the art, features and attributes associated with embodiments shown in one of the Figures may be applied to embodiments shown in others of the Figures.

Subject matter disclosed herein is generally related to subject matter disclosed in U.S. application Ser. No. 13/625,052 filed Sep. 24, 2012, which is incorporated by reference herein in its entirety.

Figure 1:
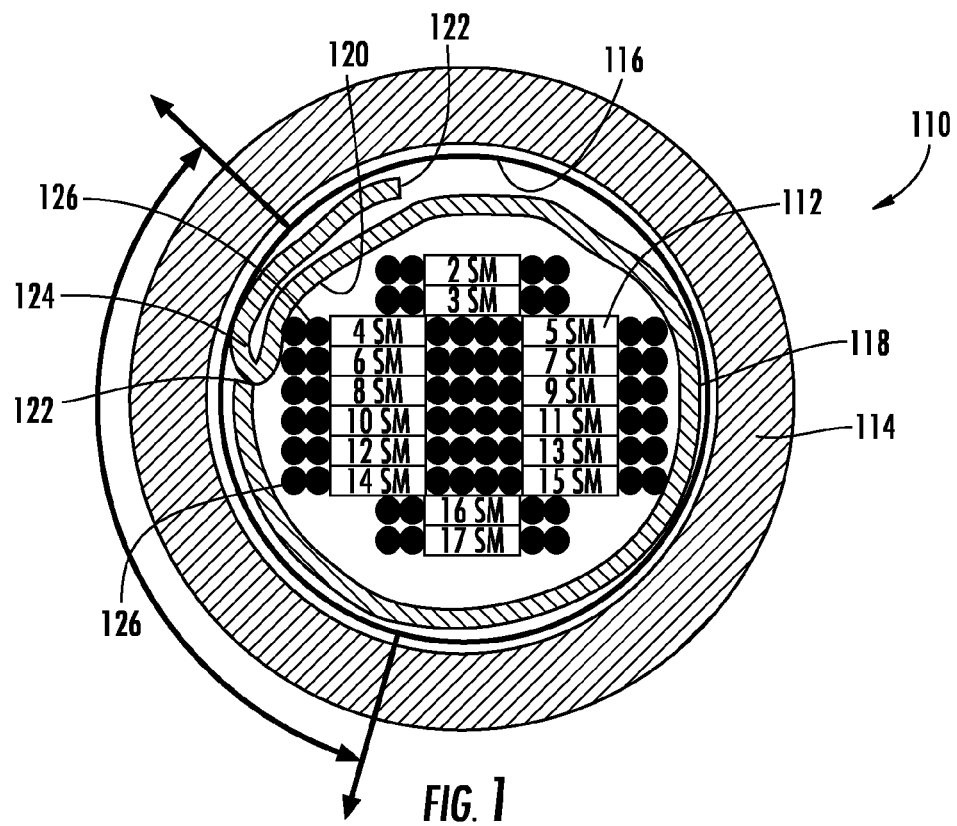
FIGS. 1-2 are cross-sectional views of fiber optic cables according to exemplary embodiments. As used herein with regard to an elongate body, such as a fiber optic cable or optical fiber, "cross-sectional" refers to the transverse cross-section, orthogonal to the length of the elongate body.

Referring to FIG. 1, a fiber optic cable 110 includes a tube 114 having an interior 116, an optical element, such as a stack of fiber optic ribbons 112, extending through the interior 116 of the tube 114, and tape 118 positioned at least partially around the stack of fiber optic ribbons 112 in the interior 116 of the tube 114, between the stack of fiber optic ribbons 112 and the tube 114. According to an exemplary embodiment, the stack of fiber optic ribbons 112 twists along a lengthwise axis of the tube 114, shown as the center of the stack 112 in FIG. 1.

While in FIG. 1 the optical element is shown as a stack of optical fiber ribbons 112, in other contemplated embodiments the optical element may include an arrangement of buffer tubes, which may be twisted ("stranded") around a central member, such as a steel or dielectric rod. The buffer tubes may include loose optical fibers, tight-buffered optical fibers, one or more ribbons of optical fibers, or other arrangements of optical fibers. In some embodiments, the optical elements may include tight-buffered optical fibers that are stranded around a central member. The exterior perimeter of such an assembly may be crenulated or undulating, similar to the perimeter of the ribbon stack 112 in cross-section.

In some embodiments, the tape 118 is a water-blocking tape. In some embodiments, the tape 118 is formed from a non-woven material having a thickness of less than 1 mm, such as less than 0.5 mm. In some embodiments, the tape 118 includes super-absorbent polymer, such as powder, integrated with the tape 118. Prior to being wrapped around the stack of ribbons 112, the tape 118 may generally be a strip having a substantially constant width. In some embodiments, the interior of the tube 114 is round and the tape 118 has an average width that is greater than the interior perimeter of the tube 114, such as at least 120% thereof.

In some embodiments, the tube 114 is a polymeric tube. The tube 114 may include polyethylene, polypropylene, polycarbonate, and/or other materials. In some embodiments, the tube is round and is less than a 1 cm in outer diameter. In other embodiments, the tube is non-round, such as a tube having an oblong exterior with a rectangular cavity defined therein. In some embodiments, the cable further includes a jacket surrounding the tube, such as a polymeric jacket, which may include polyethylene. In some embodiments, the cable may include an armor layer between the tube and the jacket. In some embodiments, the cable may include multiple tubes that are stranded around a central member and surrounded by the jacket. In other embodiments, the tube 114 is a jacket that is the exterior most portion of the cable 110, 210.

Referring again to FIG. 1, the tape 118 is positioned at least partially around the stack of fiber optic ribbons 112 in the interior 116 of the tube 114, between the stack 112 and the tube 114. Further, the tape 118 is folded such that an elevated portion 120 of the tape 118 is raised toward a lengthwise center of the interior of the tube 114. In some embodiments, as shown in FIG. 1, the tape 118 is folded on a lateral edge 122 of the tape 118 such that a fold 124 is formed that has at least two layers of the tape 118 that overlay on another. The layer of the fold 124 closest to the center of the tube 114 forms the elevated portion 120, which is raised relative to surrounding portions of the tape 118.

Figure 2:
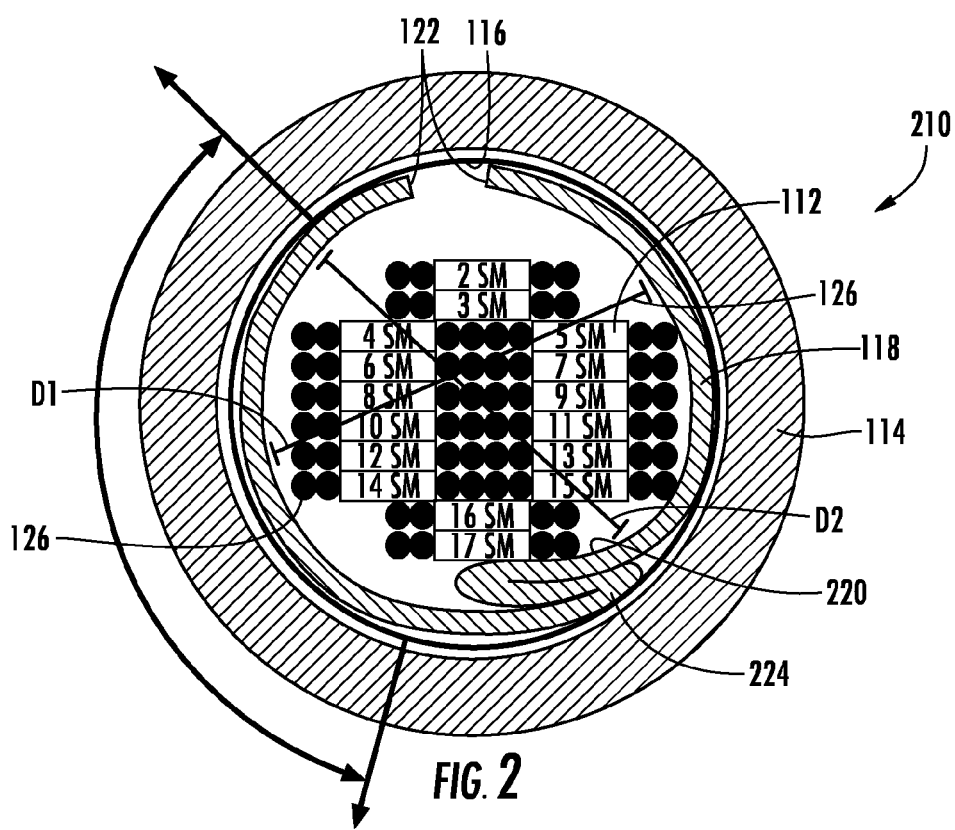

In other embodiments, as shown in FIG. 2, the tape 118 is folded in between the lateral edges 122 such that a fold 224 forms a raised portion 220. As shown in FIG. 2, the fold 224 includes three layers of the tape 118. In contemplated embodiments, the tape 118 may be folded on both lateral edges 122. In some embodiments, the tape 118 may be folded in a plurality of small folds such that the tape 118 is crinkled, and ends of the crinkles may extend toward the center of the tube 114 to form an elevated portion of the tape 118.

Referring again to FIGS. 1-2, as the stack 112 twists along the lengthwise axis of the tube 114, at a position along the length of the cable 110, 210 in which a first cross-sectional dimension $D_1$ of the stack 112 is aligned with the elevated portion 120, 220, the stack 112 interfaces with the elevated portion 120, 220 to provide frictional coupling between the stack 112 and the tube 114. In some embodiments, the first cross-sectional dimension $D_1$ is the widest cross-sectional dimension of the stack (or one of the widest). As such, for a rectilinear- or polygonal-cross-section of the stack 112, the first cross-sectional dimension $D_1$ corresponds to a section of the stack 112 including corners 126.

At another position along the length of the cable 110, 210 in which a second cross-sectional dimension $D_2$ of the stack 112 is aligned with the elevated portion 120, 220, the stack 112 has less frictional coupling with the tube 114 than in the previous position, in which the first cross-sectional dimension $D_1$ of the stack 112 is aligned with the elevated portion 120, 220. As such, for a rectilinear- or polygonal-cross-section of the stack 112, the second cross-sectional dimension $D_2$ corresponds to a section of the stack 112 between corners 126. In some embodiments, the stack 112 is rectangular in cross-section, having four corners 126. In other embodiments, the stack 112 includes wider ribbons in the middle and is tiered, as shown in FIGS. 1-2, where the stack 112 has more than four corners 126, such as six (T-shaped stack), eight (see FIGS. 1-2), twelve (three-tiered symmetric), or other numbers of corners 126.

The first cross-sectional dimension $D_1$ provides frictional coupling between the stack 112 and the tube 114 because the dimensions of the stack 112, the elevated portion 120, 220, and interior 116 of the tube 114 are coordinated so that the stack 112 presses (e.g., loads, drives, compresses) the layers of the fold 124, 224 together and/or against the interior 116 of the tube 114 as the first cross-sectional dimension $D_1$ twists past and interfaces with the elevated portion 120, 220. By contrast, the second cross-sectional dimension $D_2$ provides less frictional coupling between the stack 112 and the tube 114 because the dimensions of the stack 112, the elevated portion 120, 220, and interior 116 of the tube 114 are coordinated so that the stack 112 presses less or not at all on the layers of the fold 124, 224 as the second cross-sectional dimension $D_2$ twists past the elevated portion 120, 220.

According to an exemplary embodiment, the fold 124, 224 elevates the elevated portion 120, 220 of the tape 118 at least 350 micrometers from the interior 116 of the tube 114 toward the center of the tube 114 when uncompressed by the ribbon stack 112, such as at least 500 micrometers from the interior 116 of the tube 114. In some such embodiments, interaction with the first cross-sectional dimension $D_1$ of the stack 112 compresses the elevated portion 120, 220 to less than 300 micrometers from the interior 116 of the tube 114 toward the center of tube 114, such as less than 200 micrometers from the interior 116 of the tube 114.

Accordingly, the twisting of the stack 112 of fiber optic ribbons in combination with the folded tape 118 provides intermittent or variable coupling of the stack 112 and the tube 114. The intermittent or variable coupling helps to mitigate risks of buckling of the optical elements due to migration and changes in cable 110, 210 strain. Further, the intermediate sections of lesser coupling facilitate localized movement of the ribbon stack 112 to low-stress positions as the cable 110, 210 bends, which may improve bending performance of the optical fibers of the ribbons in the stack 112.

The length of the elevated portion 120, 220 relative to the perimeter of the interior 116 of the tube 114 may influence the magnitude of frictional coupling between the stack 112 and the tube 114. In some embodiments, the interior 116 of the tube 114 is round and the elevated portion 120, 220 covers an arc of at least 15-degrees of the interior 116, such as an arc of at least 30-degrees of the interior 116. In some embodiments, frictional coupling of the first cross-sectional dimension $D_1$ to the interior 116 of the tube 114 by way of the elevated portion 120, 220 of the tape 118 is at least twice that of the second cross-sectional dimension $D_2$, such as at least ten times that of the second cross-sectional dimension $D_2$. The value of localized frictional coupling can be estimated using empirical data corresponding to the net frictional coupling and standard numerical modeling, such as finite element analysis.

In some such embodiments or in other embodiments, the interior 116 of the tube 114 is round and the elevated portion 120, 220 covers an arc of less than 90-degrees of the interior 116, such as less than 60-degrees. Limiting the size of the elevated portion 120, 220 to a dimension less that the distance between two corners 126 of the stack 112 allows for the intermittent sections of lesser coupling. However, in other contemplated embodiments, the interior 116 of the tube 114 is round and the elevated portion 120, 220 covers an arc of at least 90-degrees of the interior 116, where the stack 112 is continuously frictionally coupled to the tube 114 along the length of the cable 110, 210.

In some such embodiments or in other embodiments, for a 30 meter length of the cable 110, 210, the net force to pull the stack 112 from the tube 114 is at least 0.05 N per optical fiber in the stack 112, which is facilitated by the frictional coupling provided by the folded tape 118. In some such embodiments, the cable 110, 210 includes eight or more optical fibers, such as 72 optical fibers. In some embodiments, for a 30 meter length of the cable 110, 210, the net force to pull the stack 112 from the tube 114 is at least 0.1 N per optical fiber in the stack 112 and/or the net force to pull the stack 112 from the tube 114 is less than 1.0 N per optical fiber in the stack 112. The net force is measured via load cell as a 30 m length of the cable 110, 210 is laid straight and constrained on a flat level surface and the stack 112 is drawn forward out of the tube 114 at a rate of about 1 m/min within a 25 to 200° C. temperature range, where net force is an average force for the first 1 m of ribbon stack 112 withdrawn from the tube 114, after overcoming static frictional forces. Empirical testing suggests embodiments disclosed herein may have net pull-out forces in the range of 0.10 to 0.50 N per 30 m of cable per fiber for cables having 500-800 kN composite strengths.

A method of manufacturing the cable 110, 210 includes steps of positioning the tape 118 around the stack 112 of fiber optic ribbons, folding the tape 118 such that layers of the tape 118 overlay and contact one another to form the fold 124, 224. The method also includes steps of twisting the stack 112 and extruding or otherwise forming a tube 114 around the stack 112 and the folded tape 118. Twisting the stack 112 in combination with the folding tape 118 and extruding the tube 114, as disclosed above, provides intermittent or variable coupling of the stack 112 and the tube 114. Applicants believe all of these materials can be inserted, applied, and assembled with conventional equipment in the industry.

The construction and arrangements of the fiber optic cable, as shown in the various exemplary embodiments, are illustrative only. Although only a few embodiments have been described in detail in this disclosure, many modifications are possible (e.g., variations in sizes, dimensions, structures, shapes, and proportions of the various members, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. For example, the tube 114 may be an outdoor cable jacket having UV-stabilizers and/or other additives in a polymeric material, such as polyethylene and/or polyvinyl chloride. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present inventive technology.

What is claimed is:

1. A fiber optic cable, comprising:
   a tube having an interior;
   a stack of fiber optic ribbons extending through the interior of the tube, wherein the stack twists along a lengthwise axis of the tube;
   water-blocking tape positioned at least partially around the stack in the interior of the tube, between the stack and the tube, wherein the water-blocking tape is folded such that an elevated portion of the water-blocking tape is raised toward a lengthwise center of the interior of the tube,
   wherein, as the stack twists along the lengthwise axis of the tube, at a position along the length of the cable in which a first cross-sectional dimension of the stack is aligned with the elevated portion, the stack interfaces with the elevated portion to provide frictional coupling between the stack and the tube, and
   wherein, at another position along the length of the cable in which a second cross-sectional dimension of the stack is aligned with the elevated portion, the stack has less frictional coupling with the tube.

2. The cable of claim 1, wherein the first cross-sectional dimension includes a corner of the stack, which, when aligned with the elevated portion, compresses the water-blocking tape against the interior of the tube.

3. The cable of claim 2, wherein the second cross-sectional dimension includes a side of the stack between corners, which, when aligned with the elevated portion, does not pin the water-blocking tape to the interior of the tube.

4. The cable of claim 3, wherein frictional coupling of the first cross-sectional dimension to the interior of the tube by way of the elevated portion of water-blocking tape is at least twice that of the second cross-sectional dimension.

5. The cable of claim 4, wherein frictional coupling of the first cross-sectional dimension to the interior of the tube by way of the elevated portion of water-blocking tape is at least ten times that of the second cross-sectional dimension.

6. The cable of claim 3, wherein, for a 30 meter length, the net force to pull the stack from the tube is at least 0.05 N per optical fiber in the stack facilitated by the frictional coupling provided by the water-blocking tape.

7. The cable of claim 6, wherein, for a 30 meter length, the net force to pull the stack from the tube is at least 0.1 N per optical fiber in the stack.

8. The cable of claim 7, wherein, for a 30 meter length, the net force to pull the stack from the tube is less than 1.0 N per optical fiber in the stack.

9. The cable of claim 1, wherein the water blocking tape is folded on a lateral edge of the tape.

10. The cable of claim 1, wherein the interior of the tube is round the elevated portion covers an arc of at least 15-degrees of the interior.

11. The cable of claim 10, wherein the interior of the tube is round the elevated portion covers an arc of at least 30-degrees of the interior.

12. The cable of claim 11, wherein the interior of the tube is round the elevated portion covers an arc of less than 90-degrees of the interior.

13. The cable of claim 1, wherein the interior of the tube is round and the water blocking tape has an average width that is greater than 120% of the interior perimeter of the tube.

14. The cable of claim 1, wherein the ribbon stack has more than four corners around the exterior periphery of the ribbon stack.

15. The cable of claim 1, wherein the fold elevates the water-blocking tape such that the elevated portion extends at least 350 micrometers from the interior of the tube toward the center of the tube when uncompressed by the ribbon stack.

16. The cable of claim 15, wherein interaction with the first cross-sectional dimension of the stack compresses the elevated portion to less than 200 micrometers from the interior of the tube toward the center of tube.

17. A fiber optic cable, comprising:
   a tube having an interior;
   an optical element comprising optical fibers extending through the interior of the tube, wherein the optical element twists along a lengthwise axis of the tube;
   tape positioned at least partially around the optical element in the interior of the tube, between the optical element and the tube, wherein the tape is folded such that an elevated portion of the tape is raised toward a lengthwise center of the interior of the tube, wherein, as the optical element twists along the lengthwise axis of the tube, at a position along the length of the cable in which a first cross-sectional dimension of the optical element is aligned with the elevated portion, the optical element interfaces with the elevated portion to provide frictional coupling between the optical element and the tube, and wherein, at another position along the length of the cable in which a second cross-sectional dimension of the optical element is aligned with the elevated portion, the optical element has less frictional coupling with the tube.

18. The cable of claim 17, wherein, for a 30 meter length, the net force to pull the optical element from the tube is at least 0.05 N per optical fiber in the optical element facilitated by the frictional coupling provided by the tape.

19. The cable of claim 17, wherein the interior of the tube is round the elevated portion covers an arc of at least 15-degrees of the interior.

20. A method of manufacturing a cable, comprising steps of:

positioning a water-blocking tape around a stack of fiber optic ribbons;

folding the water-blocking tape such that layers of the tape overlay and contact one another to form a fold;

twisting the stack;

extruding a tube around the stack and the folded water-blocking tape, wherein the water-blocking tape is positioned at least partially around the stack in the interior of the tube, between the stack and the tube, wherein the water-blocking tape is folded such that an elevated portion of the water-blocking tape is raised toward a lengthwise center of the interior of the tube, wherein, as the stack twists along the lengthwise axis of the tube, at a position along the length of the cable in which a first cross-sectional dimension of the stack is aligned with the elevated portion, the stack interfaces with the elevated portion to provide frictional coupling between the stack and the tube, and wherein, at another position along the length of the cable in which a second cross-sectional dimension of the stack is aligned with the elevated portion, the stack has less frictional coupling with the tube.

* * * * *